No. 622,303. Patented Apr. 4, 1899.
H. N. WAYNE.
PNEUMATIC TIRE.
(Application filed June 15, 1898.)
(No Model.)

WITNESSES:
A. D. Harrison.
P. W. Pezzetti.

INVENTOR
Herbert N. Wayne
By Wright, Brown & Quinby
Attys.

THE NORRIS PETERS CO., PHOTO-LITHO., WASHINGTON, D. C.

UNITED STATES PATENT OFFICE.

HERBERT N. WAYNE, OF NEWTON, MASSACHUSETTS, ASSIGNOR TO THE INTERNATIONAL RUBBER TIRE COMPANY, OF PORTLAND, MAINE.

PNEUMATIC TIRE.

SPECIFICATION forming part of Letters Patent No. 622,303, dated April 4, 1899.

Application filed June 15, 1898. Serial No. 683,479. (No model.)

*To all whom it may concern:*

Be it known that I, HERBERT N. WAYNE, of Newton, in the county of Middlesex and State of Massachusetts, have invented certain new and useful Improvements in Pneumatic Tires, of which the following is a specification.

This invention relates to a pneumatic tire provided at its outer portion with a resilient cushion which is interposed between the air-chamber and the tread-surface, said cushion being composed of sponge-rubber and serving not only to increase the resiliency of the tire, but also to protect the wall of the air-chamber against penetration by puncturing means ordinarily encountered by a pneumatic tire. Letters Patent of the United States No. 599,475, granted to Charles A. Pratt February 22, 1898, show a pneumatic tire provided with a sponge-rubber protecting-cushion adapted to operate as above indicated.

The present invention has for its object to provide certain improvements in a tire of the character shown in said Letters Patent; and it consists in the improvements which I will now proceed to describe and claim.

Figure 1:
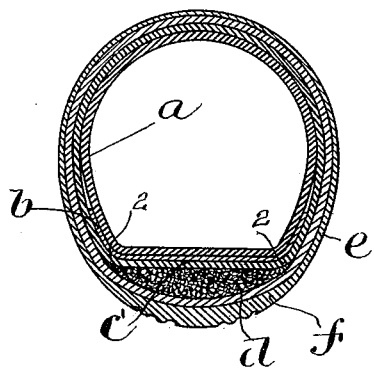
Figure 2:
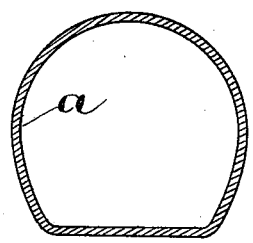
Figure 3:
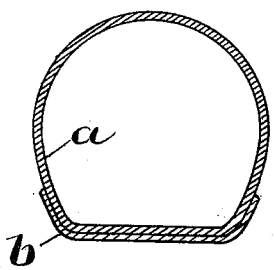
Figure 4:
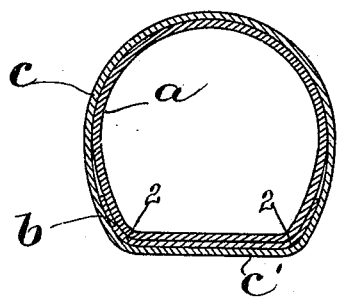
Figure 5:
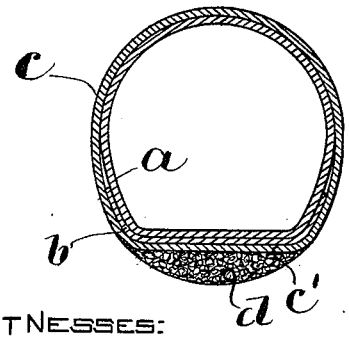
Figure 6:
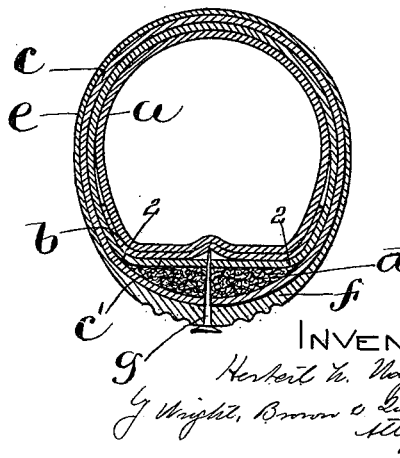

Of the accompanying drawings, forming a part of this specification, Figure 1 represents a cross-sectional view of a pneumatic tire embodying my invention. Figs. 2, 3, 4, and 5 represent sectional views illustrating steps in the operation of making the tire. Fig. 6 represents a view similar to Fig. 1.

The same letters and figures of reference indicate the same parts in all the views.

In carrying out my invention I make a pneumatic tire by first forming on a suitable mandrel or mold an air-tight tube $a$, which is composed of unvulcanized rubber.

$b$ represents a strip of non-extensible unfrictioned stock—such as cotton or linen cloth, paper, or wire-gauze—uncombined with rubber, which is placed on the outer portion of the tube $a$ before vulcanization of the latter.

$c$ represents a layer of fabric and unvulcanized rubber, otherwise known as "frictioned" stock, enveloping the tube $a$ and strip $b$, the fabric extending continuously around the tube and being combined with rubber in a manner well known to those skilled in the art to form a tubular layer which is air-tight and which can be expanded only to a limited extent.

To one side of the layer $c$ I apply a cushion $d$ of sponge-rubber, which is molded and placed upon the tube after being sufficiently vulcanized to render it spongy, the rubber being prepared so that during the process of vulcanization numerous cells will be formed in its body, giving it a spongy character. I then apply an outer tubular layer $e$, which incloses the inner layer $c$ and the cushion $d$ and is also composed of frictioned stock, the outer layer $e$ having the same characteristics as the inner layer $c$. A surface coating $f$ of unvulcanized rubber, is finally applied, and the tire thus formed is then vulcanized to cure the rubber portions and cause their adhesion to the parts with which they are in contact. The tread-surface forms a ridge or protuberance which gives the tire a narrower bearing upon the ground than would be the case if the tire were practically circular in cross-section. The portion $c'$ of the inner layer $c$, extending across the inner surface of the cushion, acts as a binder to prevent widening of the tire between the points 2 2, thus making the above-mentioned ridge or protuberance permanent.

It will be seen that the portion of the outer layer $e$ which covers the cushion $d$ has sufficient strength and durability to protect the spongy material of the cushion against wear.

In order to preserve the full elastic qualities of the sponge-rubber, it is essential that the said sponge-rubber shall not be compressed by the action of the air in the tube $a$. Owing to the fact that the strip $b$ is non-extensible the pressure of the air confined in the tube $a$ does not materially affect the cellular nature of the sponge-rubber cushion.

The strip $b$ separates the air-tight tube $a$ from the portion $c'$ of the layer $c$, so that the tube $a$ is not united to the said portion $c'$, but is free to yield inwardly with the strip $b$, as shown in Fig. 6. Hence in case a puncturing agent $g$ succeeds in penetrating the cushion $d$ and layer $c'$ the strip $b$ and tube $a$ are capable of yielding to it, and thus escaping the penetrating point.

I claim—

1. A pneumatic tire comprising an air-tube, a practically inelastic inner layer surrounding the air-tube, a practically inelastic outer layer partially separated from the inner layer, so that the two layers form a pocket, the outer layer being united to the inner layer at opposite edges of the pocket, and a cushion of sponge-rubber filling said pocket, the wall of the pocket between the sponge-rubber and the air-chamber in the tire being non-extensible.

2. A pneumatic tire comprising an air-tube, a practically inelastic inner layer surrounding the air-tube, a practically inelastic outer layer united to a portion of the inner layer and separated from another portion of the latter to form a pocket, and a cushion of sponge-rubber filling said pocket, the wall of the pocket between the sponge-rubber and the air-chamber in the tire being non-extensible.

3. A pneumatic tire comprising an air-tube, an inelastic inner layer surrounding the air-tube, and an inelastic outer layer a portion of which is separated from the corresponding portion of the inner layer by a cushioning-pocket, the outer layer being united to the inner layer at opposite sides of said pocket and constituting a guard therefor, the inner wall of the pocket being non-extensible.

4. A pneumatic tire comprising an air-tube, an inelastic inner layer surrounding the air-tube, an inelastic outer layer a portion of which is separated from the corresponding portion of the inner layer by a cushioning-pocket, the outer layer being united to the inner layer at opposite sides of said pocket and constituting a guard therefor, and an unfrictioned layer interposed between the outer portion of the air-tube and the corresponding tube-inclosing portion of the tire, the inner wall of the pocket being non-extensible.

In testimony whereof I have affixed my signature in presence of two witnesses.

HERBERT N. WAYNE.

Witnesses:
   A. D. HARRISON,
   P. W. PEZZETTI.